(12) United States Patent
Hollman et al.

(10) Patent No.: US 8,111,062 B2
(45) Date of Patent: Feb. 7, 2012

(54) LOW MASS DRIVESHAFT SPEED SENSOR ASSEMBLY

(75) Inventors: Timothy M. Hollman, San Diego, CA (US); Olivier J. Lamicq, Poway, CA (US); Kevin K. Taft, La Mesa, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 248 days.

(21) Appl. No.: 12/391,142

(22) Filed: Feb. 23, 2009

(65) Prior Publication Data

US 2010/0231201 A1 Sep. 16, 2010

(51) Int. Cl.
*G01P 3/48* (2006.01)
(52) U.S. Cl. ........................................................ 324/173
(58) Field of Classification Search .................. 324/160, 324/163, 166, 168, 176, 178, 207.25, 207.15, 324/207.16; 73/514.39; 384/448; 74/579
See application file for complete search history.

(56) References Cited

U.S. PATENT DOCUMENTS

| 5,070,743 | A | * | 12/1991 | Simon | 74/579 R |
|---|---|---|---|---|---|
| 5,200,698 | A | * | 4/1993 | Thibaud | 324/207.22 |
| 6,260,423 | B1 | * | 7/2001 | Garshelis | 73/862.336 |
| 6,538,429 | B2 | * | 3/2003 | Schroeder et al. | 324/207.2 |
| 6,642,709 | B2 | * | 11/2003 | Heimann et al. | 324/173 |
| 2004/0145363 | A1 | * | 7/2004 | Finkler | 324/164 |

OTHER PUBLICATIONS

Oxford English Dictionary, Third edition, Sep. 2005, definition of "penetrate".*

* cited by examiner

*Primary Examiner* — Melissa Koval
*Assistant Examiner* — Daniel Miller
(74) *Attorney, Agent, or Firm* — Stephen G. Mican

(57) ABSTRACT

A speed sensor assembly comprises: a driveshaft with a driveshaft axis, a sensing portion of the driveshaft having an axial bore along the driveshaft axis and multiple axial slots radially spaced around the sensing portion that penetrate through the driveshaft into the axial bore; and at least one electromagnetic sensor with a magnetic circuit proximate the sensing portion of the driveshaft; wherein rotation of the driveshaft causes the slots in the sensing portion to sequentially pass through the magnetic circuit of the electromagnetic sensor, thereby causing a change in the reluctance of its magnetic circuit that induces the electromagnetic sensor to generate an output signal that is representative of the rotational speed of the driveshaft.

10 Claims, 2 Drawing Sheets

LOW MASS DRIVESHAFT SPEED SENSOR ASSEMBLY

GOVERNMENT RIGHTS STATEMENT

The development of this invention involved government support under N00019-06-C-0081 awarded by the United States Navy. The government has certain rights in the invention.

FIELD OF THE INVENTION

The invention relates to turbomachinery, and more particularly to driveshaft speed detection in turbomachinery.

BACKGROUND OF THE INVENTION

In turbomachinery, it may be important to measure the speed of a driveshaft for the power compressor and the turbine with a high degree of accuracy. Due to the high temperatures, pressures and vibration of such machinery, the most ideal positioning of a driveshaft speed sensor is on the end of the driveshaft forward of the compressor impeller.

A shaft speed sensor assembly generally comprises a shaft speed exciter rotor mounted on the driveshaft and at least one shaft speed magnetic pickup or sensor proximate the exciter rotor. The exciter rotor generally comprises a cylindrical ferromagnetic member that has multiple teeth about its periphery to cause a change in the reluctance of the magnetic circuit for the magnetic sensor as the shaft rotates. Such an exciter may have excessive mass and volume for placement on the driveshaft forward of the compressor impeller in many applications.

Another type of shaft speed sensor for the shaft of an adjustable speed drive has used a cup member serving as an exciter rotor. The cup member retains one end of a compression spring that rotates along with an inner output shaft. The cup member has multiple perforations about its periphery that cause the reluctance of the magnetic circuit of a proximate magnetic pickup or sensor to change as the cup member and output shaft rotates.

SUMMARY OF THE INVENTION

The invention generally comprises a speed sensor assembly that comprises: a driveshaft with a driveshaft axis, a sensing portion of the driveshaft having an axial bore along the driveshaft axis and multiple axial slots radially spaced around the sensing portion that penetrate the through the driveshaft into the axial bore; and at least one electromagnetic sensor with a magnetic circuit proximate the sensing portion of the driveshaft; wherein rotation of the driveshaft causes the slots in the sensing portion to sequentially pass through the magnetic circuit of the electromagnetic sensor, thereby causing a change in the reluctance of its magnetic circuit that induces the electromagnetic sensor to generate an output signal that is representative of the rotational speed of the driveshaft.

DETAILED DESCRIPTION OF THE INVENTION

Figure 1:
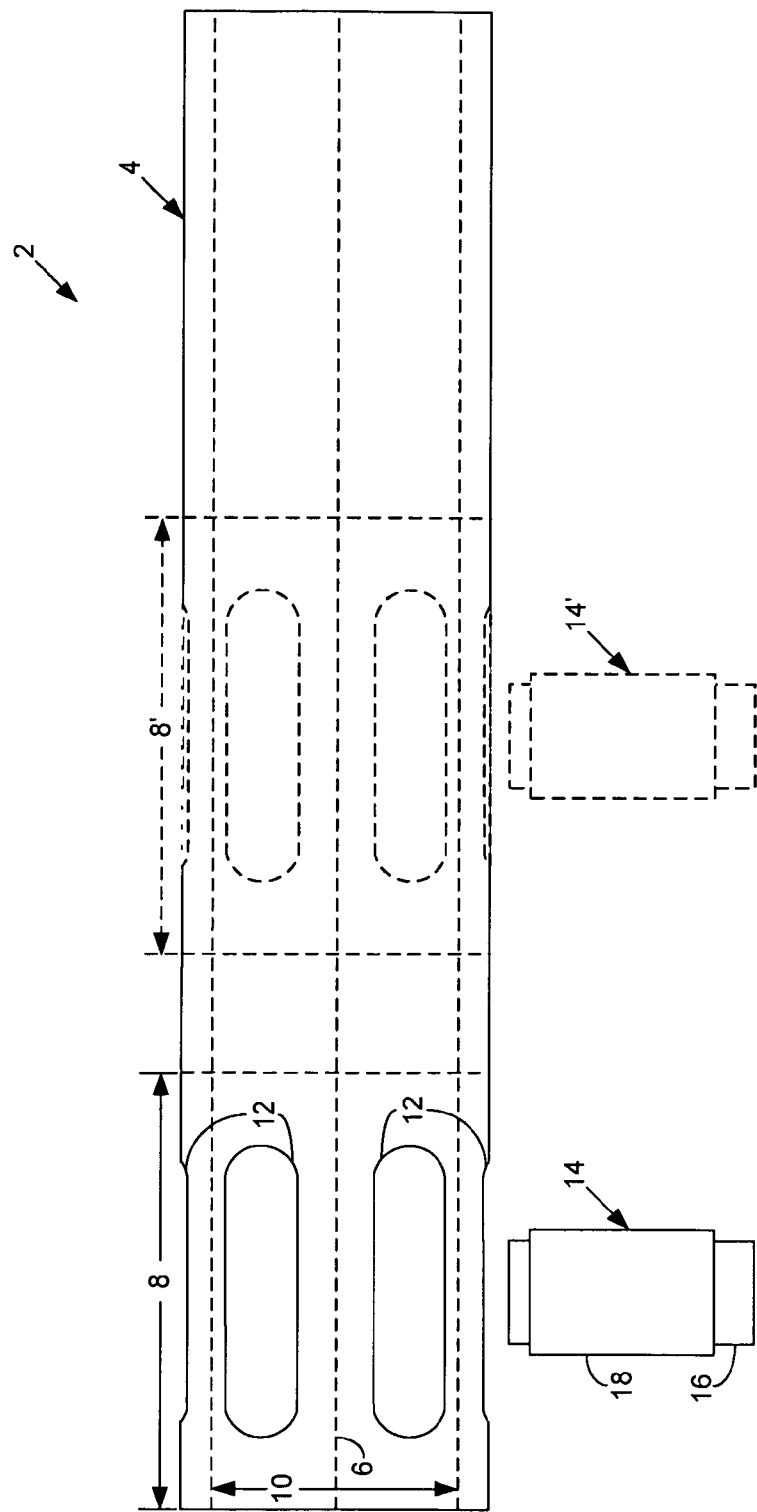
FIG. 1 is a side view of a driveshaft speed sensor assembly according to at least one possible embodiment of the invention.
Figure 2:
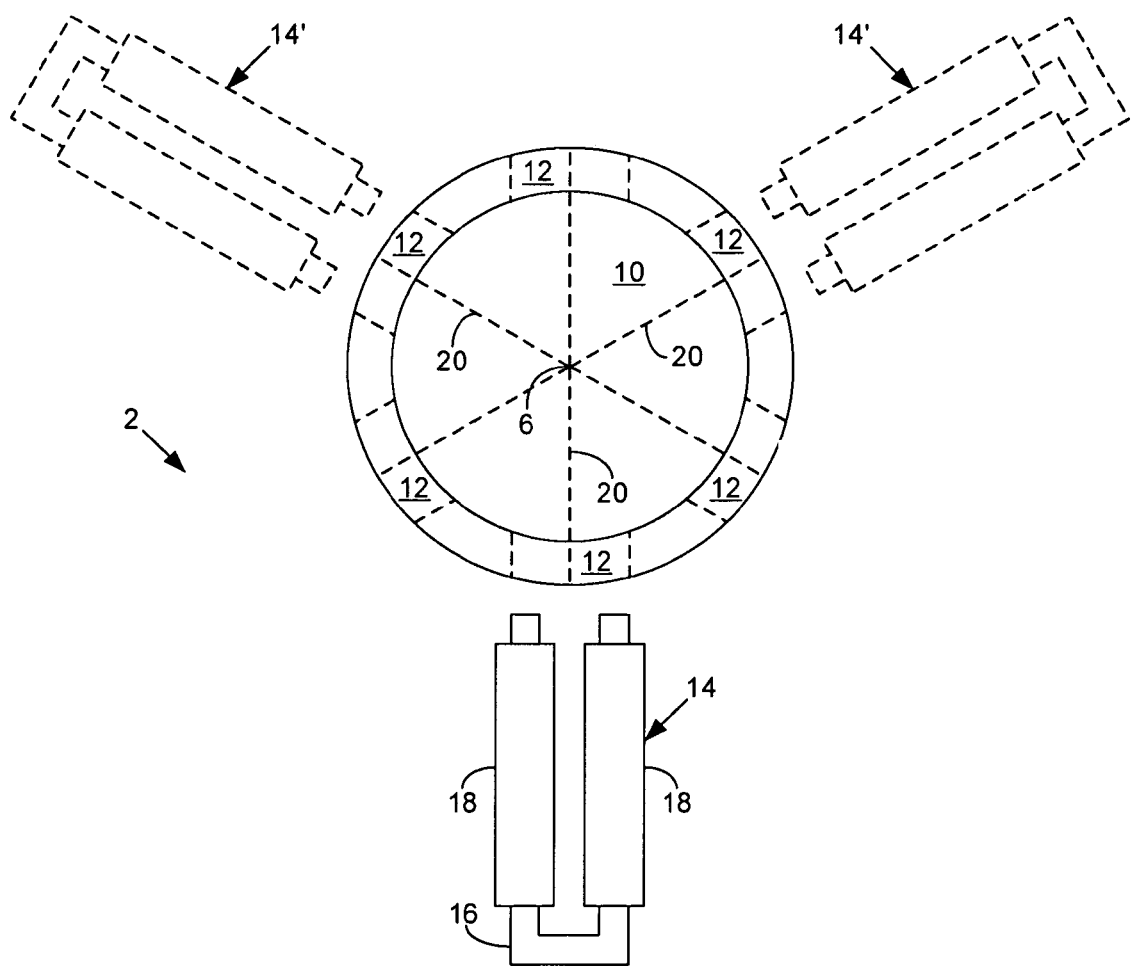
FIG. 2 is an end view of the driveshaft speed sensor assembly shown in FIG. 1.

FIG. 1 is a side view and FIG. 2 is an end view of a driveshaft speed sensor assembly 2 according to at least one possible embodiment of the invention. Referring to FIGS. 1 and 2 together, the sensor assembly 2 comprises a driveshaft 4 with a driveshaft axis 6 and a sensing portion 8. An axial bore 10 extends down the length of the driveshaft 4 from one end for at least the length of the sensing portion 8 and may in fact extend the entire length of the driveshaft 4 as shown in FIG. 1. At least the sensing portion 8 of the driveshaft 4 comprises a ferromagnetic material. Multiple axial slots 12 radially spaced around the sensing portion 8 of the driveshaft 4 penetrate through the driveshaft 4 into the axial bore 10. Formation of both the axial bore 10 and the axial slots 12 may be by way of boring, machining or other means.

At least one electromagnetic sensor 14 is proximate the sensing portion 8 of the driveshaft 4. The electromagnetic sensor 14 has a magnetic circuit, such as formed by a magnetic pole piece 16, and an electric circuit, such as formed by electric coils 18. As the driveshaft 4 rotates about the driveshaft axis 6, the slots 12 cause periodic increases in the reluctance of the magnetic circuit of the electromagnetic sensor 14. The changes in reluctance of the magnetic circuit induce current in the electric circuit of the electromagnetic sensor 14 that generates an output signal representative of these periodic changes in reluctance proportional to the rotational speed of the driveshaft 4.

For instance, with six of the slots 12 as shown and a rotational speed of the driveshaft 4 of 20,000 revolutions per minute (rpm), the sensing portion 8 and sensor 14 combination will generate an output signal that has 2000 pulses per second in the time domain or a frequency of 2000 Hz in the frequency domain. Counting pulses may provide an accurate measurement of position as well, with more slots 12 providing a higher degree of position accuracy.

If the axial bore 10 extends the entire length of the driveshaft 4 as shown, the sensing portion 8 and electromagnetic sensor 14 may have any position between the ends of the driveshaft 4 as FIG. 1 indicates in dashed line with sensing portion 8' and electromagnetic sensor 14'. This may be beneficial in applications where it is more convenient to place these elements between the ends of the driveshaft 4.

When the sensing portion 8 is on one end of the driveshaft 4, the driveshaft 4 may be multi-sectional and the sensing portion 8 of the driveshaft 4 may be an end section of the driveshaft 4. The attachment of the sensing portion 8 of the driveshaft 4 to the remainder of the driveshaft 4, as well as any other sections of the driveshaft 4 to each other, may be by any convenient means, such as fastening by way of at least one fastener, such as a bolt, or by welding, such as by inertia welding.

The sensor assembly 2 may have multiple electromagnetic sensors 14 that surround the sensing portion 8 of the driveshaft 4. FIG. 2 indicates in dashed line two additional electromagnetic sensors 14', with each electromagnetic sensor 14 positioned about the driveshaft axis 6 in alignment with radial lines 20 that intersect the driveshaft axis 6. Multiple electromagnetic sensors 14 may provide sensor redundancy or signal isolation of independent measuring circuits or systems.

The described embodiments of the invention are only some illustrative implementations of the invention wherein changes and substitutions of the various parts and arrangement thereof are within the scope of the invention as set forth in the attached claims.

The invention claimed is:

1. A speed sensor assembly that comprises:
   a driveshaft with a driveshaft axis, the driveshaft defining an axial bore along at least a portion of the driveshaft axis and multiple axial slots that radiate from the axial bore and pass through the driveshaft to an outer surface of the driveshaft, the axial bore and multiple axial slots defining a sensing portion of the driveshaft; and
   at least one electromagnetic sensor with a magnetic circuit proximate the sensing portion of the driveshaft;
   wherein rotation of the driveshaft causes the slots in the sensing portion to sequentially pass through the magnetic circuit of the electromagnetic sensor, thereby causing a change in the reluctance of its magnetic circuit that induces the electromagnetic sensor to generate an output signal that is representative of the rotational speed of the driveshaft.

2. The speed sensor assembly of claim 1, wherein multiple electromagnetic sensors surround the sensing portion of the driveshaft.

3. The speed sensor assembly of claim 1, wherein the axial bore and the multiple axial slots comprise machined apertures in the driveshaft.

4. The speed sensor assembly of claim 1, wherein the sensing portion of the driveshaft is along one end of the driveshaft.

5. The speed sensor assembly of claim 4, wherein the axial bore extends from the sensing portion end of the driveshaft for at least the length of the sensing portion.

6. The speed sensor assembly of claim 1, wherein the axial bore extends the entire length of the driveshaft.

7. The speed sensor of claim 6, wherein the sensing portion of the driveshaft is between the ends of the driveshaft.

8. The speed sensor assembly of claim 1, wherein the driveshaft is multi-sectional and the sensing portion of the driveshaft comprises a section of the driveshaft that attaches to one end of the remainder of the driveshaft.

9. The speed sensor assembly of claim 8, wherein the sensing portion attaches to the remainder of the driveshaft by welding.

10. The speed sensor assembly of claim 8, wherein the sensing portion attaches to the remainder of the driveshaft by means of at least one fastener.

* * * * *